July 31, 1956  J. M. McGEE  2,756,652
APPARATUS FOR, AND METHOD OF, MAKING SELF-VENTING
LINERS FOR CONTAINER-SEALING CAPS
Filed March 24, 1955  4 Sheets-Sheet 1
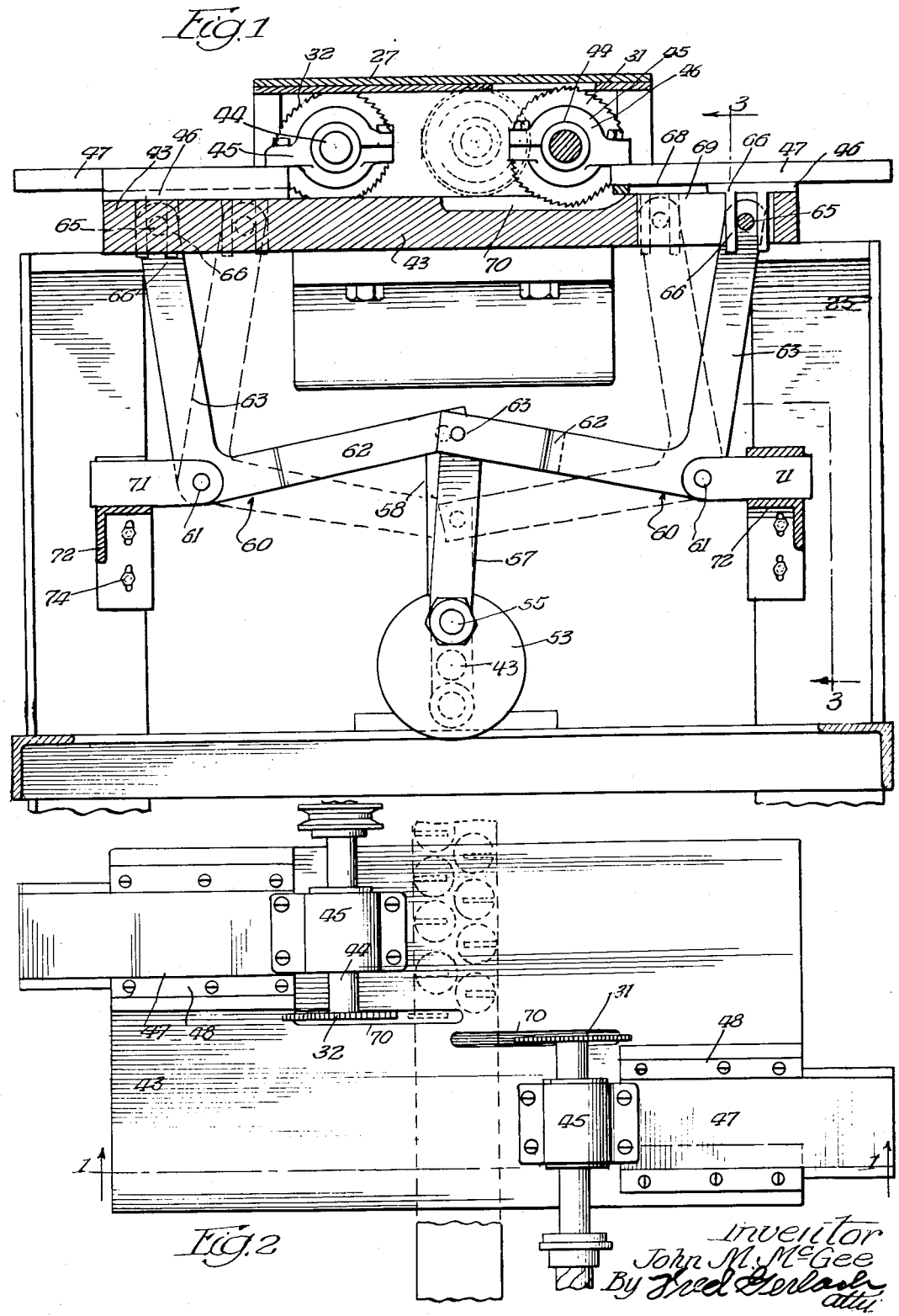

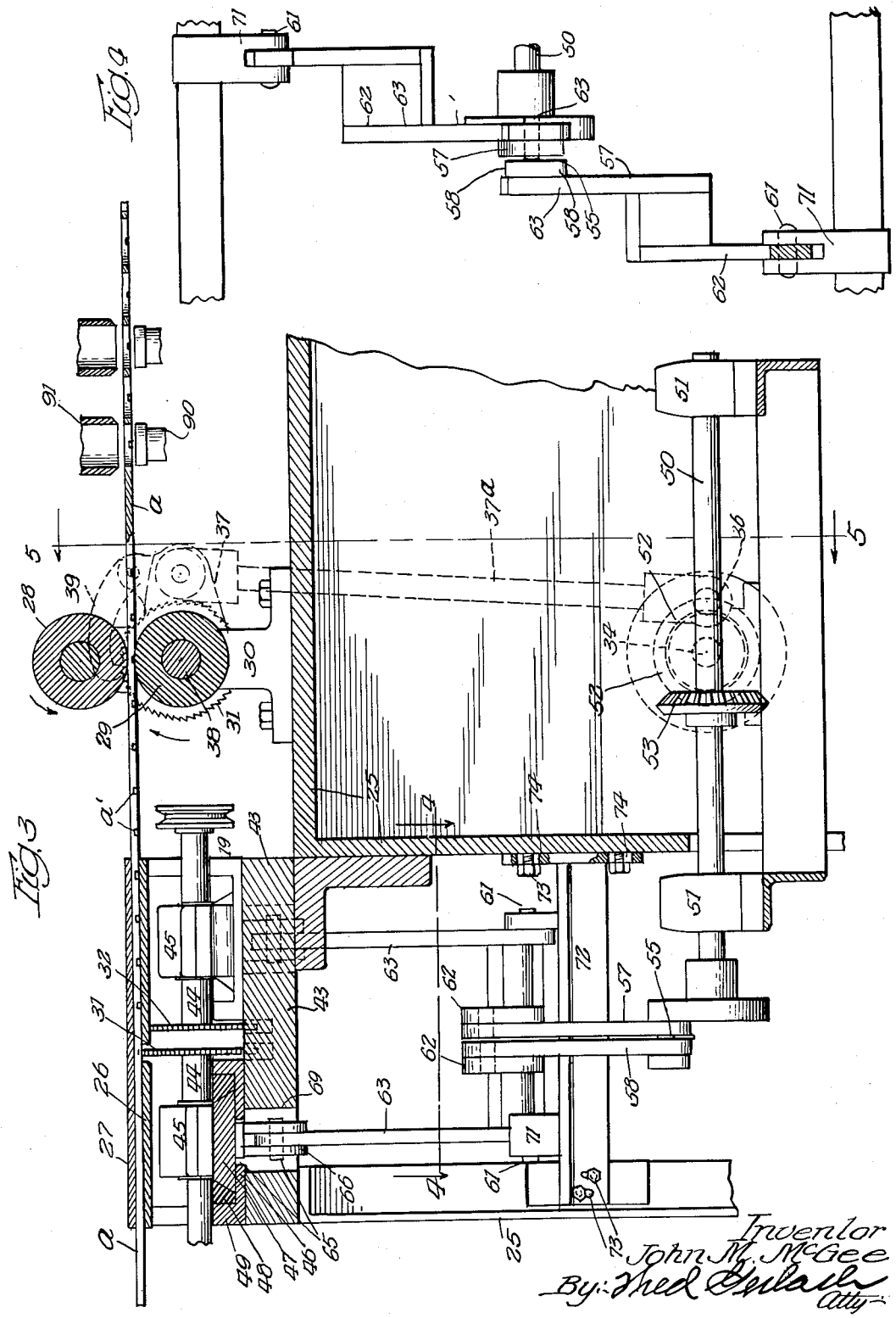

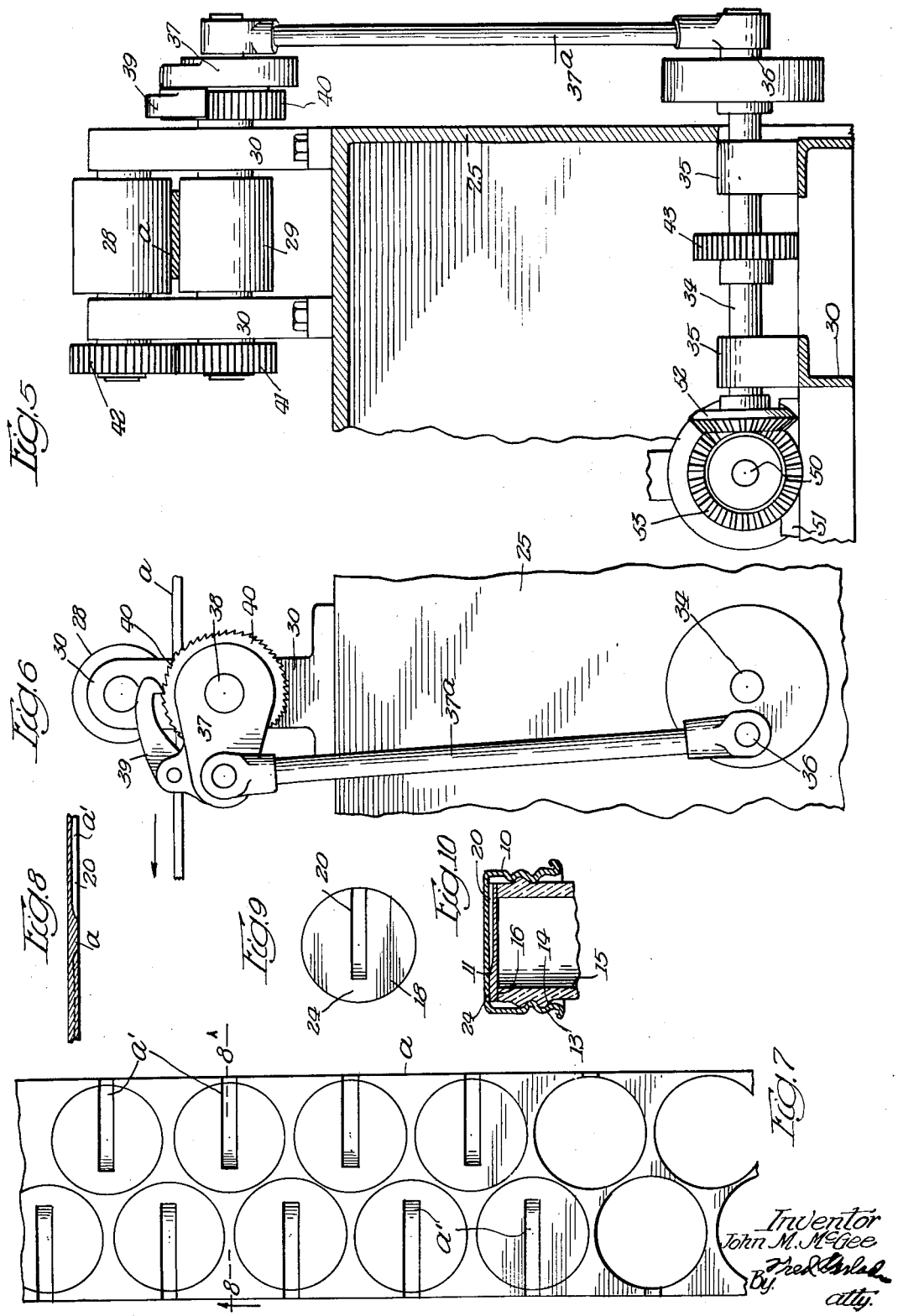

July 31, 1956 J. M. McGEE 2,756,652
APPARATUS FOR, AND METHOD OF, MAKING SELF-VENTING
LINERS FOR CONTAINER-SEALING CAPS
Filed March 24, 1955 4 Sheets-Sheet 4
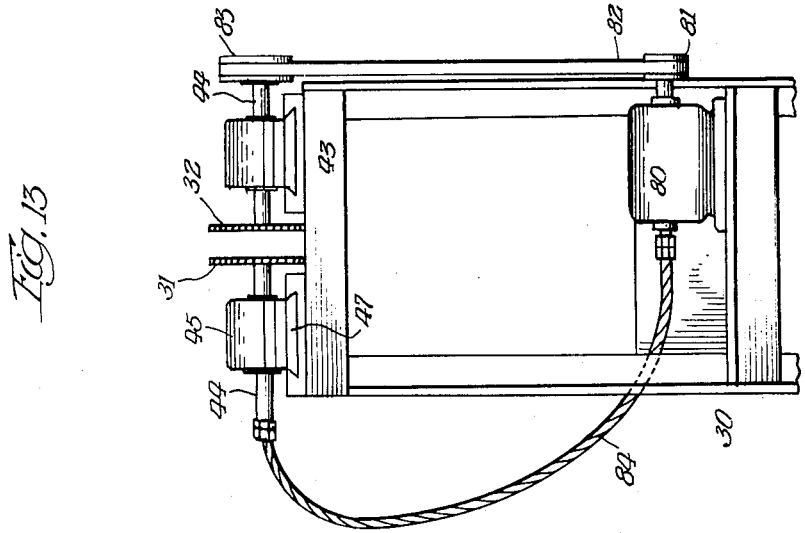
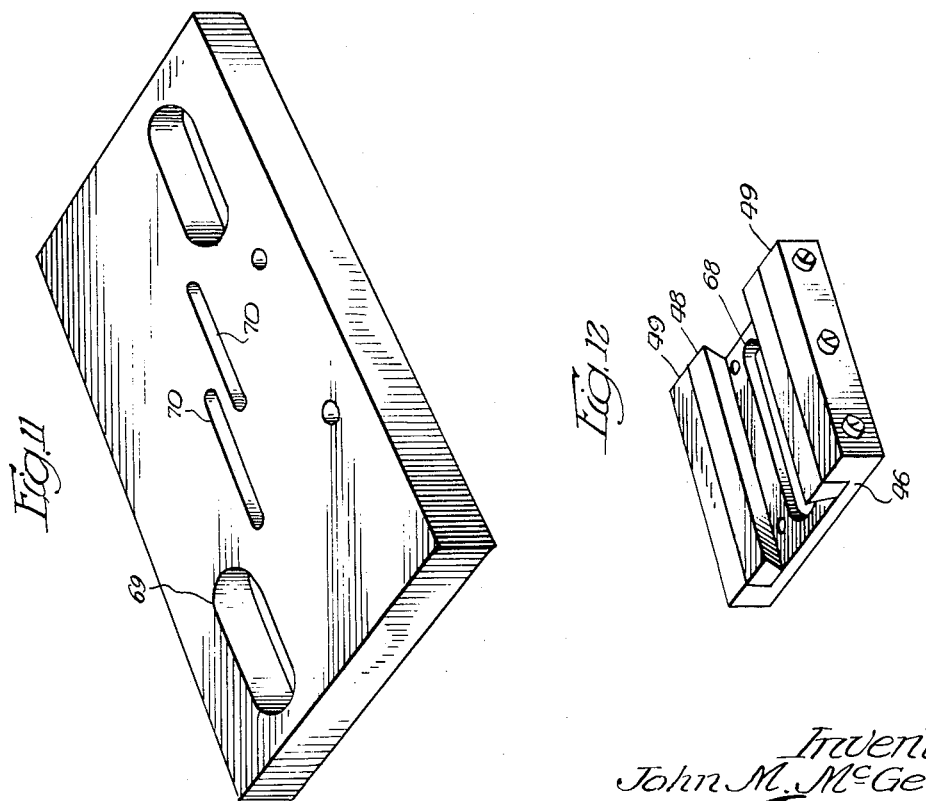
Inventor:
John M. McGee
By Thed Gerlach
his Atty

United States Patent Office 2,756,652
Patented July 31, 1956

2,756,652

APPARATUS FOR AND METHOD OF MAKING SELF-VENTING LINERS FOR CONTAINER-SEALING CAPS

John M. McGee, Evansville, Ind., assignor to Bernardin Bottle Cap Company, Inc., Evansville, Ind., a corporation of Indiana Application March 24, 1955, Serial No. 496,439

15 Claims. (Cl. 93—1.3)

The invention relates to apparatus for and methods of making self-venting liners for sealing closure-caps and containers for fluids under pressure.

In liner-disks, it has been found that a groove or channel extending diametrically across the disk resulted in failure from fatigue when subjected to pressure for long periods, and that central lands which interrupted the channels reduced these failures. When, however, the disks have small diameters, for example 1 inch, central lands did not result in channels of sufficient length or areas of reduced thickness for efficient self-venting.

One object of the invention is to provide apparatus for and a method of making self-venting liner-disks with grooves which provide vent-channels in the liners which include a circumferential land adapted to overlie the seat or rim on the container, and a groove which extends from a point adjacent said seat and land diametrically to the opposite edge of the disk, so that in liners of small diameters the grooves will be of sufficient length for self-venting.

Another object of the invention is to provide apparatus for and a method of forming the liner-disks from continuous strips of suitable sheet material, such as cardboard, by cutting the vent-channels transversely of the strips and in spaced longitudinal succession.

Another object of the invention is to provide apparatus for and a method of efficiently and economically fabricating self-venting liner-disks.

Other objects will appear from the detail description.

The invention consists in the several novel features hereinafter set forth and more particularly defined at the conclusion hereof.

In the drawings:

Fig. 1 is a vertical section taken on line 1—1 of Fig. 2;

Fig. 2 is a plan view of a portion of the apparatus including the rotary cutters and the guides for slidably supporting the carriages for the cutters for cutting transverse grooves in the continuous strip of cardboard;

Fig. 3 is a section taken on line 3—3 of Fig. 1;

Fig. 4 is a section taken on line 4—4 of Fig. 3;

Fig. 5 is a section taken on line 5—5 of Fig. 3;

Fig. 6 is a side elevation of the step-by-step feed mechanism for advancing the cardboard strip;

Fig. 7 is a plan view of the strip of cardboard illustrating the arrangement of the grooves and the cutting of the disks from the strip;

Fig. 8 is a section taken on line 8—8 of Fig. 7;

Fig. 9 is a plan view of a finished liner;

Fig. 10 is a section of a closure including the sealing disk;

Fig. 11 is a perspective of the bed-plate for the cutting mechanism;

Fig. 12 is a perspective view of one of the guides for a carriage on which the cutters are mounted; and Fig. 13 is a diagrammatic view of driving mechanism for the cutters.

The closure comprises a sheet metal cap generally designated 10 which includes a top wall 11 and a depending skirt provided with a screw-thread 13 which is adapted to be secured on a mating screw-thread 14 on the neck of a container 15. The rim 16 of the container functions as a seat for the liner or sealing disk generally designated 18. The disk 18 is circular in contour and produced from a strip of cardboard of uniform thickness so that its faces are planar. The lower face of the liner normally seats on the rim 16 and forms a seal between the liner and the container when the liner is clamped onto the container. The upper face of the liner abuts the top wall 11 of the cap and its lower face is usually provided with a coating which is impervious to gases and liquids in the container. The upper face of the liner disk has a formation for self-venting when the pressure in the container becomes excessive or exceeds a predetermined limit. This formation consists of a groove 20 which is formed by cutting away some of the stock from one face of the disk. The groove 20 has parallel sides, intersects the periphery of the disk and extends diametrically to a circumferential land 24 which overlies the rim of the container. The groove 20 is of uniform depth from its intersection with the periphery to its inner end which is of gradually decreasing depth to the land 24. For example, in a disk of 1" in diameter the land is of sufficient length, for example $\frac{3}{16}$", to overlap the rim of the container, and the groove is $\frac{3}{16}$" in width. At the periphery of the disk, the groove has a depth of about .02" to .04". The disks 18 are punched in staggered rows from a continuous or elongated strip $a$ of cardboard which is drawn from a coil (not shown) and the grooves $a'$ are cut transversely in one face of the strip and extend inwardly and alternately from its opposite edges for the disks in the staggered rows respectively, as shown in Fig. 7.

The exemplification of apparatus for fabricating these liners comprises: a suitable supporting structure 25; stationarily supported guide-means for the strip $a$ which includes a plate 26 underlying said strip, and a platen 27 overlying said strip; a pair of coacting feed-rolls 28 and 29 journalled in bearings 30 for intermittently advancing the strip; a pair of rotary milling tool cutters 31 and 32 for removing material from the strip to form grooves $a'$ in the under face of the strip $a$; mechanism for reciprocating the cutters to cut the grooves transversely of the strip $a$; and mechanism for punching the disks from the strip. The strip $a$ is slidably confined between platen 27 and plate 26 and is intermittently advanced for successively cutting grooves $a'$ spaced longitudinally of the strips $a$.

Mechanism for imparting intermittent unidirectional rotative strokes to the feed-rolls comprises: a power-driven shaft 34 which is journalled in bearings 35 on structure 25; a crank or wrist pin 36 driven by shaft 34; a pitman 37 pivoted to wrist pin 36; a crank-arm 37 to which pitman 37$a$ is pivoted and which is pivoted on the shaft 38 of feed-roll 29; a pawl 39 pivoted on arm 37; a ratchet wheel 40 fixed to shaft 38 and roll 29; and a gear 41 fixed to rotate with roll 29 and meshing with a gear 42 on the shaft of upper roll 28. Shaft 34 is driven by a gear 43 which is driven from a suitable source of power. During half revolutions of shaft 34, crank pin 36, pitman 37$a$, crank 37 and pawl 39 will impart oscillatory strokes to ratchet 40 to operate the feed-rolls 28 and 29 to advance the strip $a$ and during alternate half revolutions of the shaft 34 the feed-rolls will remain stationary during groove-forming operations of the cutters 31 and 32.

The cutters 31 and 32 are of rotary mill cutting type and are slidably mounted to produce transverse grooves $a'$ extending inwardly from the opposite edges of strip $a$ for the staggered rows of disks respectively. The cutters are movable transversely and are rotatable in vertical planes and are offset longitudinally of the strip for simultaneously cutting the grooves for a pair of disks in the staggered rows. The supporting structure 25 includes a stationary bed-plate or table 43 on which the cutters are movably mounted. Each cutter has a shaft 44 which is journalled in a bearing 45 which is fixed to the inner end of a slidable carriage 47. Each carriage 47 is slidable transversely of the strip a in a guide structure which includes a plate 46 which is secured on bed-plate 43, and bars 48 which are adjustably secured along upstanding side flanges 49 on platen 46. Bars 48 and carriage 47 have dovetailed edges for rectilinear movement of the carriage.

The cutters and carriage 47 have sufficient stroke to cut the grooves a' in the strip a during each stationary cycle of said strip and to travel clear of said strip during the advancing strokes of the strip a. The mechanism for imparting reciprocating strokes to the cutters and its carriages 47 comprises: a shaft 50 which is journalled in bearings 51 on the supporting structure 25; a bevel gear 52 fixed to and driven by shaft 34; a bevel gear 53 fixed to shaft 50 and meshing with gear 52; and a crank or wrist pin 55 rotated by shaft 50 which is connected to simultaneously shift the carriages 47 on which the cutters are mounted to and from and partially across the strip a for operating the cutters transversely of said strip to cut the grooves a'. During each inward stroke of the carriages 47 the cutters will initially travel transversely of the strip and until the advancing stroke of the strip has been completed and thereafter across the under face of the strip to cut the grooves a' in staggered rows in the strip a. One carriage 47 and the cutter mounted thereon is operable from wrist pin 36 by a link 57, and the other carriage 47 with the cutter thereon is simultaneously operable from wrist pin 36 by a link 58. Each of the links 57 and 58 is operatively connected to one of the carriages 47 by a bell crank 60 which has a fulcrum pin 61 on the supporting structure and is provided with an arm 62 pivoted to one of the links 57 and 58, and an upstanding arm 63. Each arm 63 at its upper end is provided with a pin 65 which slidably engages a forked depending lug or bracket 66 which is secured to the underside of a slide 47. Each guide-plate 46 is provided with a slot 68 and table 43 is provided with a slot 69 for the travel of lug 66 and upper end of lever arm 63. The bed plate 43 is provided with recesses 70 for clearance of the lower portion of cutters 31 and 32. The fulcrum pins 61 for the bell crank levers are pivoted in lugs 71 which are supported on frame bars 72 on the supporting structure 25. One end of each bar 72 is adjustably connected by bolts and slots 73 and its other end is connected by bolts and slots 74 to upright members of the structure 25 for vertically adjusting the fulcrum pins 61 and the reciprocatory strokes of the cutters relatively to the strip a.

The cutters 31 and 32 are continuously driven by any suitable means for example an electric motor 80 with a shaft which is provided with a pulley 81 for driving an endless belt 82 which drives a pulley 83 on the shaft 44 of cutter 32, and a flexible shaft 84 between said motor and the shaft 44 of cutter 31.

After the strip a advances beyond the feed rolls and during each of its stationary cycles, a pair of staggered liners 18 are simultaneously punched from the strip a in staggered rows by mating male and female dies 90 and 91 which are diagrammatically shown in Fig. 3. This punching severs the disks 18 so they will have a circular edge, a circumferential land 24 and a groove intersecting the edge of the disk and extending across one face of the disk 18 to a land 24 on the diametrically opposite edge portion of the disk.

The method of producing and the operation of the apparatus for making the liners are as follows: the strip of cardboard a is threaded between platen 27 and plate 26 into the grip of feed rolls 28 and 29. Shaft 34 will be continuously driven and will through gears 52 and 53 synchronously drive the shaft 50. The feed rolls 28 and 29 will be intermittently operated to advance the strip a the distance necessary to position it for cutting grooves a' in successive pairs of disks in staggered rows by means of wrist pin 36 which is driven by shaft 34, pitman 37a, crank arm 37, pawl 39 and ratchet wheel 40. The shaft 50 will drive the wrist pin 55 to operate the bell crank levers 63 to shift the carriages 47 and impart reciprocatory strokes to the bearings 45, shafts 44 and cutters 31 and 32. The cutters are continuously driven and have simultaneous in-and-out strokes. Each cutter during its instroke will be shifted bodily, assuming it is to be at the end of its outstroke and laterally away from one side edge of the strip a until the cutter encounters one edge of said strip. In continuation of its inward movement, the upper arc of each cutter will cut the groove a' transversely of the strip a sufficient distance for forming the groove so its inner end will be terminated to leave a land 24 in the disk subsequently punched from the strip. During each outstroke, the cutter will be withdrawn from the groove it has formed during its instroke and moved transversely away from its adjacent edge of the strip. During at least the first half of the inward cycle and last half of the outward cycle of each cutter, each cutter will be clear of the strip and the strip will be advanced. During the last portion of the instroke of each cutter it will penetrate the lower face of strip a and cut a transverse groove a' in the bottom face of the strip. During the last portion of the instroke and the initial portion of the outstroke of each cutter, the feed rolls 28 and 29 will remain stationary to avoid interference with the transverse cutting of the grooves a'. During each stationary cycle of the feed rolls, the dies 90 and 91 will be actuated to punch a staggered pair of disks 18 from strip a. In the operation of the cutters, their upper portions will cut grooves with parallel sides and of uniform depth to form the intersected edge to a point adjacent the land where it gradually decreases in depth until it merges unto the land 24. This formation in the grooves 20 provides grooves of sufficient length in disks of small diameters for self venting between the portion of the disk of reduced thickness between the intersection of the groove and the edge of the disk and the land for preventing stresses in the bottom of the groove which result in rupture from fatigue which results from pressure in the receptacle.

The invention exemplifies apparatus for and a method of feeding a continuous strip longitudinally and cutting self venting grooves or channels transversely of the strip for producing the liners in succession economically and expeditiously.

The invention is not to be understood as restricted to the details set forth since these may be modified within the scope of the appended claims without departing from the spirit and scope of the invention.

Having thus described the invention which I claim as new and desire to secure by Letters Patent is:

1. Apparatus for making self-venting liners for sealing caps on containers from a continuous or elongated strip of flexible sheet material, comprising: mechanism for intermittently advancing the strip longitudinally; a cutting tool movably supported to operate transversely of the strip and cut grooves in one face of the strip; mechanism for operating the tool to cut grooves intersecting one edge of the strip and extending inwardly and transversely of the strip to leave portions of full thickness at their inner ends in spaced relation longitudinally of the strip; and mechanism for severing circular disks from the strip, each with a circumferential land of full thickness at its edge at one side of the disk and a groove extending diametrically from the land and intersecting the circumferential edge at the opposite side of the disk.

2. Apparatus for making self-venting liners for sealing caps on containers from a continuous or elongated strip of flexible sheet material, comprising: mechanism for intermittently advancing the strip longitudinally; a continuously driven rotary cutting tool movably supported to operate transversely of the strip and cut grooves in one face of the strip; mechanism for operating the tool to cut grooves intersecting one edge of the strip and extending inwardly and transversely of the strip to leave portions of full thickness at their inner ends in spaced relation longitudinally of the strip; and mechanism for severing circular disks from the strip, each with a circumferential land of full thickness at its edge at one side of the disk and a groove extending diametrically from the land and intersecting the circumferential edge at the opposite side of the disk.

3. Apparatus for making self-venting liners for sealing caps on containers from a continuous or elongated strip of flexible sheet material, comprising: mechanism for intermittently advancing the strip longitudinally; a cutting tool movably supported to operate transversely of the strip and cut grooves in one face of the strip; mechanism for operating the tool during stationary cycles of the strip to cut grooves intersecting one edge of the strip and extending inwardly and transversely of the strip to leave portions of full thickness at their inner ends in spaced relation longitudinally of the strip; and mechanism for severing circular disks from the strip, each with a circumferential land of full thickness at its edge at one side of the disk and a groove extending diametrically from the land and intersecting the circumferential edge at the opposite side of the disk.

4. Apparatus for making self-venting liners for sealing caps on containers from a continuous or elongated strip of flexible sheet material, comprising: mechanism for intermittently advancing the strip longitudinally; a continuously driven rotary cutting tool movably supported to operate transversely of the strip and cut grooves in one face of the strip; mechanism for operating the tool during stationary cycles of the strip to cut grooves intersecting one edge of the strip and extending inwardly and transversely of the strip to leave portions of full thickness at their inner ends in spaced relation longitudinally of the strip; and mechanism for severing circular disks from the strip, each with a circumferential land of full thickness at its edge at one side of the disk and a groove extending diametrically from the land and intersecting the circumferential edge at the opposite side of the disk.

5. Apparatus for making self-venting liners for sealing caps on containers from a continuous or elongated strip of flexible sheet material, comprising: mechanism for intermittently advancing the strip longitudinally; a cutting tool movably supported to operate transversely of the strip and cut grooves in one face of the strip; mechanism including a carriage mounted to slide transversely of the strip and on which the cutter is mounted for operating the tool to cut grooves intersecting one edge of the strip and extending inwardly and transversely of the strip to leave portions of full thickness at their inner ends in spaced relation longitudinally of the strip; and mechanism for severing circular disks from the strip, each with a circumferential land of full thickness at its edge at one side of the disk and a groove extending diametrically from the land and intersecting the circumferential edge at the opposite side of the disk.

6. Apparatus for making self-venting liners for sealing caps on containers from a continuous strip of flexible sheet material, comprising: mechanism for intermittently advancing the strip longitudinally; a pair of cutting tools movably supported to operate transversely of the strip to cut grooves in one face of the strip; mechanism for operating the tools to cut grooves intersecting the edges of the strip respectively and extending inwardly and transversely partially across the strip to leave portions of full thickness at the inner ends of the grooves and spaced longitudinally of the strips; and mechanism for severing circular disks from the strip, each with a circumferential land of full thickness at the edge at one side of the disk, and a groove extending diametrically from the land across the disk to and intersecting the edge at the opposite side of the disk.

7. Apparatus for making self-venting liners for sealing caps on containers from a continuous strip of flexible sheet material, comprising: mechanism for intermittently advancing the strip longitudinally; a pair of cutting tools movably supported to operate transversely of the strip to cut grooves in one face of the strip; mechanism for operating the tools to cut grooves alternately intersecting the edges of the strip respectively and extending inwardly and transversely partially across the strip to leave portions of full thickness at the inner ends of the grooves and spaced longitudinally of the strips; and mechanism for severing circular disks in staggered rows from the strip, each with a circumferential land of full thickness at the edge at one side of the disk and a groove extending diametrically from the land across the disk to and intersecting the edge at the opposite side of the disk.

8. Apparatus for making self-venting liners for sealing caps on containers from a continuous strip of flexible sheet material, comprising: mechanism for intermittently advancing the strip longitudinally; a pair of continuously driven rotary cutting tools movably supported to operate transversely of the strip to cut grooves in one face of the strip; mechanism for operating the tools to cut grooves intersecting the edges of the strip respectively and extending inwardly and transversely partially across the strip to leave portions of full thickness at the inner ends of the grooves and spaced longitudinally of the strip; and mechanism for severing circular disks from the strip, each with a circumferential land of full thickness at the edge at one side of the disk and a groove extending diametrically from the land across the disk to and intersecting the edge at the opposite side of the disk.

9. Apparatus for making self-venting liners for sealing caps on containers from a continuous strip of flexible sheet material, comprising: mechanism for intermittently advancing the strip longitudinally; a pair of continuously driven rotary cutting tools movably supported to operate transversely of the strip to cut grooves in one face of the strip; mechanism for operating the tools to cut grooves during stationary cycles of the strip intersecting the edges of the strip respectively and extending inwardly and transversely partially across the strip to leave portions of full thickness at the inner ends of the grooves and spaced longitudinally of the strips; and mechanism for severing circular disks from the strip, each with a circumferential land of full thickness at the edge at one side of the disk, and a groove extending diametrically from the land across the disk to and intersecting the edge at the opposite side of the disk.

10. Apparatus for making self-venting liners for sealing caps on containers from a continuous strip of flexible sheet material, comprising: mechanism for intermittently advancing the strip longitudianlly; a pair of cutting tools movably supported to operate transversely of the strip to cut grooves in one face of the strip; mechanism including carriages mounted to slide transversely of the strip and on which the cutters are respectively mounted for operating the tools to cut grooves intersecting the edges of the strip respectively and extending inwardly and transversely partially across the strip to leave portions of full thickness at the inner ends of the grooves and spaced longitudinally of the strips; and mechanism for severing circular disks from the strip, each with a circumferential land of full thickness at the edge at one side of the disk, and a groove extending diametrically from the land across the disk to and intersecting the edge at the opposite side of the disk.

11. Apparatus for making self-venting liners for sealing caps on containers from a continuous strip of flexible sheet material, comprising: a pair of coacting feed-rolls for advancing the strip longitudinally; mechanism for intermittently operating the feed-rolls; a pair of rotary cutting tools, offset logitudinally of the strip for cutting grooves in one face of the strips; means for continuously driving said tools; transversely slidable carriages on which the tools are journalled respectively; mechanism for slidably operating the carriages to impart transverse cutting strokes to the tools to cut grooves intersecting the strip at its opposite edges and terminating to leave lands of full thickness at the inner ends of the grooves; and mechanism for severing circular liner disks from the strip, each having a circumferential land at its edges at one side of the disk and a groove extending diametrically from the land to intersecting the edge at the opposite side of the disk.

12. That improvement in fabricating self-venting liners for sealing caps on containers which comprises: longitudinally and intermittently advancing a continuous or elongated strip of flexible sheet material having planar faces; successively cutting in one face of the strip transverse grooves spaced apart longitudinally of the strip, each groove having parallel sides intersecting one edge of and extending transversely of the strip and terminating at a portion of full thickness at the inner end of the groove; and successively severing circular disks from the strip, each having a land of full thickness at its edge at one side of the disk and a groove extending diametrically from the land to and intersecting the edge at the opposite side of the disk.

13. That improvement in fabricating self-venting liners for sealing caps on containers which comprises: longitudinally and intermittently advancing a continuous or elongated strip of flexible sheet material having planar faces; successively cutting in one face of the strip transverse grooves spaced apart longitudinally of the strip, each groove having parallel sides intersecting one edge of and extending transversely of the strip and having its inner end of gradually decreasing depth terminating at a portion of full thickness at the inner end of the groove; and successively severing circular disks from the strip, each having a land of full thickness at its edge at one side of the disk and a groove extending diametrically from the land to and intersecting the edge at the opposite side of the disk.

14. That improvement in fabricating self-venting liners for sealing caps on containers which comprises: longitudinally and intermittently advancing a continuous or elongated strip of flexible sheet material having planar faces; successively cutting in one face of the strip transverse grooves spaced apart longitudinally, intersecting the edges of the strip and in staggered relation alternately from the edge of the strip, each groove having parallel sides extending inwardly partially across the strip and terminating at a portion of full thickness at the inner end of the groove; and successively severing circular disks in staggered rows from the strip, each having a circumferential land of full thickness at one side of its edge, and extending diametrically across the disk from the land to and intersecting the edge at the opposite side of said edge.

15. That improvement in fabricating self-venting liners for sealing caps on containers which comprises: longitudinally and intermittently advancing a continuous or elongated strip of flexible sheet material having planar faces; successively cutting in one face of the strip transverse grooves spaced apart longitudinally, intersecting the edges of the strip and in staggered relation alternately from the edges of the strip, each groove having parallel sides extending inwardly partially across the strip having its inner end of gradually decreasing depth and terminating at a portion of full thickness at the inner end of the groove; and successively severing circular disks in staggered rows from the strip, each having a circumferential land of full thickness at one side of its edge and extending diametrically across the disk from the land to and intersecting the edge at the opposite side of said edge.

No references cited.